Dec. 5, 1961     W. J. JOHNSON     3,011,402
OPTICAL OBJECTIVE
Filed Dec. 8, 1958
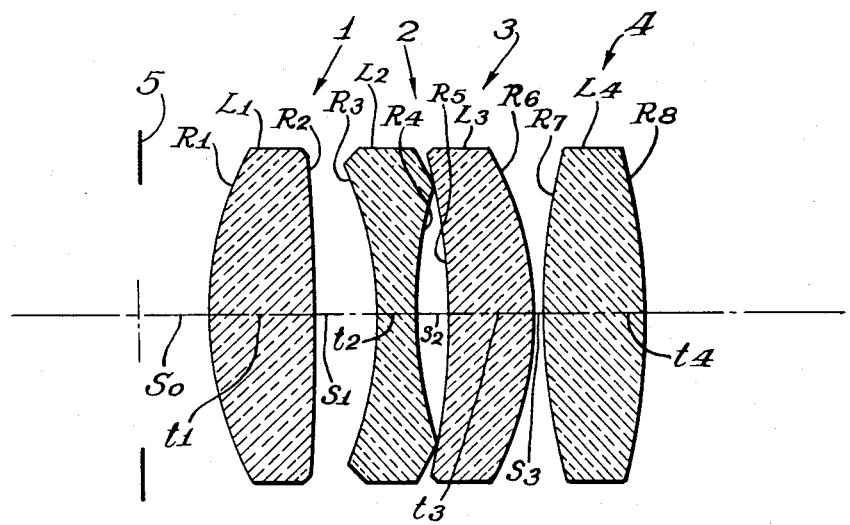
Inventor:
Walter J. Johnson
By Robert F. Wiehle, Atty.

United States Patent Office 3,011,402
Patented Dec. 5, 1961

3,011,402
OPTICAL OBJECTIVE
Walter J. Johnson, Mundelein, Ill., assignor to Bell & Howell Company, Chicago, Ill., a corporation of Illinois
Filed Dec. 8, 1958, Ser. No. 778,817
3 Claims. (Cl. 88—57)

This invention relates to an optical objective primarily intended for photographic uses but also capable of other uses, and more particularly to a front stop lens system for a camera corrected for spherical aberrations, coma, curvature of field, distortion, astigmatism, and both axial and lateral chromatic aberration.

An object of the invention is to provide a camera objective with a stop positioned at the long conjugate side of the objective and with correction of oblique field aberrations normally caused by such a stop position as well as correction of all other aberrations.

Another object of the invention is to provide a large aperture objective having a front stop and highly corrected for third and higher order aberrations.

A further object of the invention is to provide a large aperture camera objective having a front stop and four components behind the stop in which the front, rear and one of the inner components are positive and the other inner component is negative. The positive intermediate component may be a meniscus concave to the stop and may be positioned adjacent to the rear component.

It is to be understood that the terms "front" and "rear" as herein used refer to the ends of the objective respectively nearer the longer and shorter conjugates thereof.

The invention will be better understood by reference to the accompanying drawing, in which the single figure is a longitudinal section through an objective forming one embodiment of the invention.

The invention provides a front stop, large aperture objective which is optically corrected. The objective comprises a positive front lens behind the stop and followed at a substantial distance by second, third and rear, closely spaced, lenses of which the second lens is biconcave, the third lens is a concave forwardly meniscus and the rear lens is biconvex. The front lens has a weakly positive rear curvature to correct third order coma aberration. The meniscus third lens is concave forwardly to permit the negative power of the second lens to be weaker and to give a long back focal length and give compactness and good correction of third and higher order aberrations to the system. The positive rear surface of the third lens also permits the rear lens to be weaker so as to obtain correction of third and higher order aberrations of the system. The rear lens may be equiconvex for economy of manufacture.

Referring now in detail to the drawing, the objective includes a front positive component 1, a negative second component 2, a positive meniscus third component 3 and a biconvex rear component 4 all positioned behind a stop or iris 5. The component 1 comprises a biconvex lens $L_1$ spaced a distance $s_0$ behind the stop. The second component is a biconcave lens $L_2$, the third a positive meniscus lens $L_3$ concave forwardly and in edge contact with the lens $L_2$, and the fourth a biconvex rear lens $L_4$ which may be equiconvex and is spaced closely to the lens $L_3$. Proceeding from front to rear, $R_1$ to $R_8$ designate the respective radii of curvature of the spherical optical surfaces, $t_1$ to $t_4$ the axial thicknesses and $s_1$ to $s_3$ the axial separations.

For a high degree of correction, power of the lens $L_1$ lies between 83 and 167 percent of the overall power of the objective, the power of the lens $L_2$ between $-125$ and $-333$ percent of the overall power of the objective, the power of the lens $L_3$ between 48 and 77 percent of the overall power of the objective and the power of the lens $L_4$ between 77 and 143 percent of the overall power of the objective. These limits expressed in terms of focal lengths are as follows:

$$.6F < f_1 < 1.2F$$
$$-.8F < f_2 < -.3F$$
$$1.3F < f_3 < 2.1F$$
$$.7F < f_4 < 1.3F$$

wherein $f_1$, $f_2$, $f_3$ and $f_4$ are the focal lengths of the four components and F is the equivalent focal length of the combined objective with spacing of the components as follows:

$$.05F < s_1 < .20F$$
$$.04F < s_2 < .15F$$
$$0 < s_3 < .1\ F$$
$$.6F < B.F.L. < .8F$$

Also, for high correction, the radii of the individual components shall have a definite relationship with the equivalent focal length of the combined system.

$$0.5F < R_1 < 1.0F$$
$$2.5F < -R_2 < 100F$$
$$-1.0F < R_3 < -.5F$$
$$.6F < R_4 < 1.1F$$
$$-1.7F < R_5 < -1.1F$$
$$-.9F < R_6 < -.4F$$
$$1.0F < R_7 < 1.6F$$
$$-1.6F < R_8 < -1.0F$$

To retain the correct balance of third order correction of spherical, coma, and astigmatism the individual elements must have a shape in accordance with the following:

$$L_1 -.20 < \frac{R_1}{R_2} < -.01$$

$$L_2 -1.0 < \frac{R_3}{R_4} < -.7$$

$$L_3\quad 1.8 < \frac{R_5}{R_6} < 2.7$$

$$L_4 -1.2 < \frac{R_7}{R_8} < -.8$$

An objective constituting a preferred embodiment of the invention and corrected to at least a relative aperture of $f/1.8$ is constructed in compliance with the following example in which dimensions are in terms of inches and in which $n_d$ designates the indices of refraction for the D line and V the Abbe dispersion numbers:

[Equivalent focal length = .394. Back focal length = .276]

| | | | | |
|---|---|---|---|---|
| $L_1$ | $R_1 = +.269$ | $s_0 = .083$ | | |
| | $R_2 = -1.851$ | $t_1 = .083$ | $n_d = 1.700$ | $V = 47.8$ |
| $L_2$ | $R_3 = -.288$ | $s_1 = .049$ | | |
| | $R_4 = +.337$ | $t_2 = .030$ | $n_d = 1.751$ | $V = 27.7$ |
| $L_3$ | $R_5 = -.562$ | $s_2 = .026$ | | |
| | $R_6 = -.246$ | $t_3 = .069$ | $n_d = 1.651$ | $V = 55.8$ |
| $L_4$ | $R_7 = +.519$ | $s_3 = .005$ | | |
| | $R_8 = -.519$ | $t_4 = .079$ | $n_d = 1.651$ | $V = 55.8$ |

The above objective is highly corrected for third and higher order aberrations and this with the front stop which simplifies the mechanical construction of many types of cameras.

While the invention is thus described, it is not wished to be limited to the precise details described, as changes

What is claimed is:

1. In an optical objective, in the order named, a front stop, a front biconvex singlet lens, a biconcave singlet lens, a positive meniscus singlet lens, and an equiconvex singlet lens, and further characterized in that the objective is constructed in substantial conformity with the following table in which dimensions are in terms of inches and proceeding from front to rear $L_1$ to $L_4$ designate the lenses, $R_1$ to $R_8$ the radii of curvature of the surfaces, $t_1$ to $t_4$ the axial thicknesses, $s_0$ to $s_3$ the axial separations, $n_d$ the indices of refraction for the D line and V the Abbe dispersion numbers:

[Equivalent focal length=.394. Back focal length=.276]

| | | | | |
|---|---|---|---|---|
| $L_1$ | $R_1=+.269$ | $s_0=.083$ | | |
| | $R_2=-1.851$ | $t_1=.083$ | $n_d=1.700$ | $V=47.8$ |
| | | $s_1=.049$ | | |
| $L_2$ | $R_3=-.288$ | | | |
| | $R_4=+.337$ | $t_2=.030$ | $n_d=1.751$ | $V=27.7$ |
| | | $s_2=.026$ | | |
| $L_3$ | $R_5=-.562$ | | | |
| | $R_6=-.246$ | $t_3=.069$ | $n_d=1.651$ | $V=55.8$ |
| | $R_7=+.519$ | $s_3=.005$ | | |
| $L_4$ | | $t_4=.079$ | $n_d=1.651$ | $V=55.8$ |
| | $R_8=-.519$ | | | |

2. In an optical objective, in the order named, a front biconvex singlet lens, a biconcave singlet lens, a positive meniscus singlet lens, and an equiconvex singlet lens, and further characterized in that the objective is constructed in substantial conformity with the following table in which dimensions are in terms of inches and proceeding from front to rear $L_1$ to $L_4$ designate the lenses, $R_1$ to $R_8$ the radii of curvature of the surfaces, $t_1$ to $t_4$ the axial thicknesses, $s_1$ to $s_3$ the axial separations, $n_d$ the indices of refraction for the D line and V the Abbe dispersion numbers:

[Equivalent focal length=.394. Back focal length=.276]

| | | | | |
|---|---|---|---|---|
| $L_1$ | $R_1=+.269$ | $t_1=.083$ | $n_d=1.700$ | $V=47.8$ |
| | $R_2=-1.851$ | $s_1=.049$ | | |
| $L_2$ | $R_3=-.288$ | | | |
| | $R_4=+.377$ | $t_2=.030$ | $n_d=1.751$ | $V=27.7$ |
| | | $s_2=.026$ | | |
| $L_3$ | $R_5=-.562$ | $t_3=.069$ | $n_d=1.651$ | $V=55.8$ |
| | $R_6=-.246$ | $s_3=.005$ | | |
| | $R_7=+.519$ | $t_4=.079$ | $n_d=1.651$ | $V=55.8$ |
| $L_4$ | $R_8=-.519$ | | | |

3. In an optical objective, a front stop, a positive front lens, a negative second lens, a positive meniscus third lens, and a positive biconvex lens, and further characterized in that the objective is constructed in substantial compliance with the following inequalities in which proceeding from front to rear $R_1$ to $R_8$ designate the respective radii of curvature of the surfaces, F the equivalent focal length of the objective, B.F.L. the back focal length, and proceeding from front to rear $s_1$ to $s_3$ designate the axial separations and $f_1$ to $f_4$ the respective focal lengths of the lenses:

$$.5F<R_1<F$$
$$2.5F<R_2<100F$$
$$-1.0F<R_3<-.5F$$
$$.6F<R_4<1.1F$$
$$-1.7F<R_5<-1.1F$$
$$-.9F<R_6<-.4F$$
$$1.0F<R_7<1.6F$$
$$-1.6F<R_8<-1.0F$$

$$-.20<\frac{R_1}{R_2}<-.01$$

$$-1.0<\frac{R_3}{R_4}<-.7$$

$$1.8<\frac{R_5}{R_6}<2.7$$

$$-1.2<\frac{R_7}{R_8}<-.8$$

$$.6F<f_1<1.2F$$
$$-.8F<f_2<-.3F$$
$$1.3F<f_3<2.1F$$
$$.7F<f_4<1.3F$$
$$.05F<S_1<.20F$$
$$.04F<S_2<.15F$$
$$0<S_3<.1F$$
$$.6F<B.F.L.<.8F$$

References Cited in the file of this patent

UNITED STATES PATENTS

| | | |
|---|---|---|
| 660,747 | Bausch | Oct. 30, 1900 |
| 1,540,752 | Bielicke | June 9, 1925 |
| 1,739,512 | Lee | Dec. 17, 1929 |
| 2,003,881 | Grosset et al. | June 4, 1935 |
| 2,343,629 | Altman | Mar. 7, 1944 |
| 2,601,367 | Cook | June 24, 1952 |

FOREIGN PATENTS

| | | |
|---|---|---|
| 22,157 | Great Britain | of 1910 |
| 372,228 | Great Britain | May 5, 1932 |
| 626,371 | Great Britain | July 14, 1949 |
| 403,706 | Germany | Oct. 7, 1924 |

OTHER REFERENCES

"Principles of Optics," by Hardy and Perrin, 1932 edition, pages 68–79, published by McGraw-Hill Book Co., New York, N.Y.